Dec. 1, 1970  G. C. BERGER  3,543,601
VEHICLE SPEED CONTROLLER
Filed April 4, 1968  2 Sheets-Sheet 1

INVENTOR.
GEORGE C. BERGER
BY
Williamson, Palmatier & Bains
ATTORNEYS

Dec. 1, 1970  G. C. BERGER  3,543,601
VEHICLE SPEED CONTROLLER

Filed April 4, 1968  2 Sheets-Sheet 2

INVENTOR.
GEORGE C. BERGER
BY
Williamson, Palmatier & Bain
ATTORNEYS

United States Patent Office 3,543,601
Patented Dec. 1, 1970

3,543,601
VEHICLE SPEED CONTROLLER
George C. Berger, Erskine, Minn. 56535
Filed Apr. 4, 1968, Ser. No. 718,809
Int. Cl. G05g 11/00
U.S. Cl. 74—513                                    4 Claims

ABSTRACT OF THE DISCLOSURE

An accelerator attachment for a vehicle engine incorporates a connector member extending between a tension spring and the accelerator linkage, the connector member being constructed and arranged to move freely to permit normal movement of the accelerator pedal below a predetermined maximum speed, and the movement of the pedal to its maximum speed position causing the connector member to engage a resilient stop which offers sufficient resistance to indicate to the driver that the preset maximum speed has been reached. Further depression of the accelerator pedal beyond the maximum speed position is required to move the connector member past the resilient stop against the resistance of the spring, which then operates to exert a restraining force against the movement of the connector member and accelerator linkage beyond their maximum speed position.

---

Various devices have been developed to limit and control the speed of vehicles by exerting a restraining force on the accelerator linkage connected to the carburetor of the vehicle engine. Most of these devices have proved to be unsatisfactory because they are unduly complicated, difficult to install, and are not readily adjustable by the driver of the vehicle. Probably the most significant shortcomings of prior art accelerator control devices are their susceptability to jamming, thereby greatly endangering the occupants of the vehicle, and their failure to provide a clear signal to the driver when a maximum, predetermined speed has been reached.

Having in mind the foregoing disadvantages associated with prior art speed controllers, I have developed an extremely compact, low-cost accelerator control mechanism which is particularly characterized by its simplicity of operation, ease of adjustment, and ability to clearly indicate to a driver the attainment of a predetermined, maximum speed.

These basic objects have been realized by the use of a simple, lost motion connector secured between a portion of a vehicle's accelerator linkage and a tension spring held at one end within a housing convenietly secured to the vehicle's dashboard. In the preferred embodiment of my invention, the lost motion connector takes the form of a flexible chain which is adjusted to move freely with the accelerator pedal until a predetermined maximum speed is reached, at which time the chain will become taut between the accelerator linkage and the tension spring. Further movement of the accelerator linkage to increase the speed of the vehicle must then be accomplished under the restraining influence of the tension spring.

As a particularly advantageous feature of my invention, I employ a resilient stop device adapted to be engaged by a movable coupling between the aforesaid lost motion connector and the tension spring when the accelerator linkage of the vehicle has been advanced to its preset, maximum speed position. The restraining impact of the resilient stop device on the accelerator pedal serves to clearly notify the driver when the maximum speed has been reached.

A further beneficial aspect of my invention resides in the provision for the longitudinal adjustment of the aforesaid spring housing within an outer guide cylinder by means of an adjusting screw threadedly connected to one end of the housing, the adjusting screw having a turning knob on one end thereof which is readily accessible to the operator of the vehicle.

These and other objects and advantages of my invention will become readily apparent as the following description is read in conjunction with the accompanying drawings in which like reference numerals have been used to designate like elements throughout the several views, and wherein.

Figure 1:
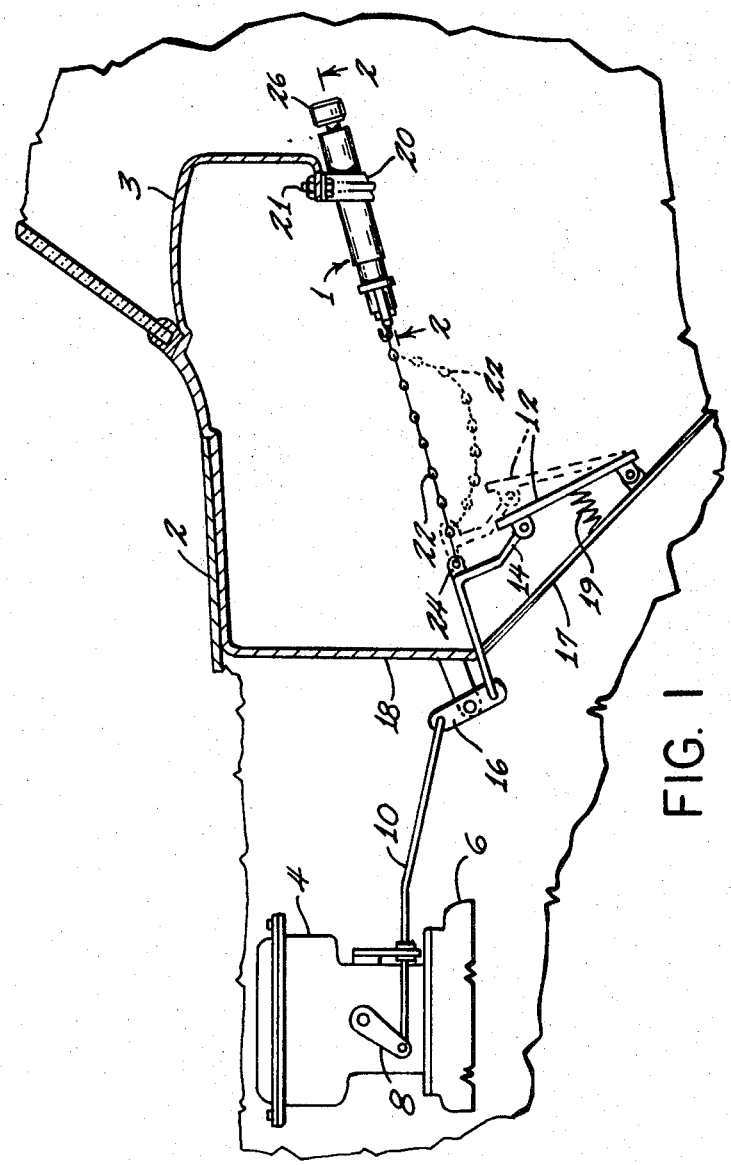
FIG. 1 is a side elevation view showing my improved speed controller installed on a vehicle.

Referring now to FIG. 1 of the drawings, my speed controller device, generally indicated by reference numeral 1, is shown installed within a vehicle 2 having a carburetor 4 mounted on its engine 6. A throttle or accelerator valve (not shown) within carburetor 4 is operated by crank arm 8 which is actuated by longitudinally shiftable connecting rod 10 in a conventional manner. Movement is imparted to connecting rod 10 by accelerator pedal 12 having a linkage arm 14 extending from the underside thereof to a point of connection with pivotal lever 16 connected to rod 10. Foot pedal 12 is pivotally mounted on base portion 17 of fire wall 18, and may be depressed downwardly against spring 19 from an idle position to operate crank 8 so as to feed more gasoline to engine 6 in a manner well known in the art.

Speed control device 1 is shown supported from dashboard 3 by an adjustable bracket 20 removably attached to the underside of dashboard 3 by fasteners 21. It is to be noted that device 1 is angularly adjusted with respect to bracket 20 so that lost motion connector 22 may extend downwardly in substantial alignment with tubular control device 1 when attached at its lower end to apertured member 24 on lever arm 14 of the accelerator linkage. Although various types of lost motion devices, including connecting rods slidable with respect to each other for a predetermined distance, could be employed to achieve the desired maximum speed regulation of accelerator pedal 12, I have found flexible chain 22 to be a particularly effective and simple mechanism for this purpose. Also shown in FIG. 1 is an adjustable control knob 26 for changing the maximum speed setting in a manner fully described below.

Figure 2:
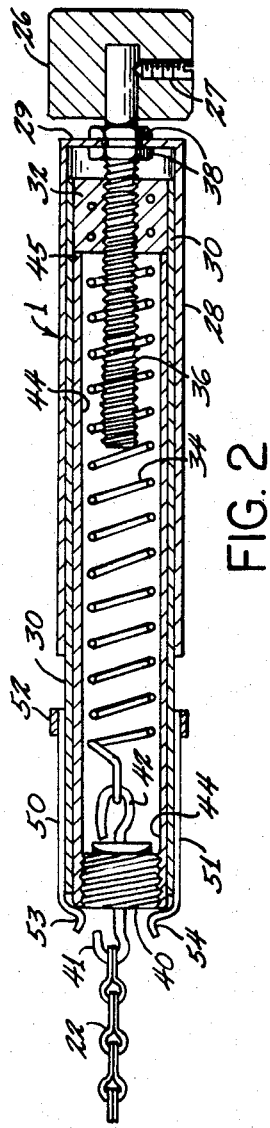
FIG. 2 is a longitudinal section view through the controller operating mechanism taken along lines 2—2 of FIG. 1.

Referring now to FIG. 2, control device 1 comprises an outer guide cylinder 28 within which longitudinally adjustable spring housing and carrier 30 is slidably contained. Spring housing 30 is of generally tubular shape and includes a base portion 32 within which one end of tension spring 34 is securely embedded. Extending longitudinally within tubular housing 30 in threaded engagement with base portion 32 is an adjusting screw 36. Adjusting screw 36 is preferably arranged coaxially with housing 30 and has adjusting knob 26 fastened to its outer end by means of set screw 27. Longitudinal movement of adjusting screw 36 within housing 30 is prevented by lock nuts 38 mounted on screw 36 on either side of end wall 29 of guide cylinder 28. The outer end of spring 34 is connected to chain 22 by threaded coupling 40 having hooked end portions 41 and 42 attached to chain 22 and spring 34 respectively. Coupling 40 is threadedly secured within the outer end of tubular sleeve 44 in the position shown in FIG. 2. At the time of assembling control device 1, spring 34 will be placed in tension by pulling it outwardly to connect its outer end to hook 42 on coupling 40. With device 1 assembled in the manner shown in FIG. 2, the inner end 45 of tubular sleeve 44 will abut against base portion 32 of spring housing 30, thereby preventing the complete retraction of spring 34.

Figure 4:
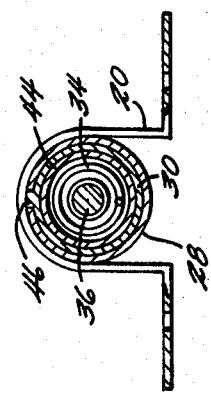
FIG. 4 is a cross-section of the controller taken along lines 4—4 of FIG. 3.

As is indicated in FIG. 1, chain 22 will be slack when accelerator pedal 12 is in its idle position shown in phantom line, thus permitting chain 22 to move freely with lost motion as accelerator pedal 12 is depressed towards its maximum speed, solid line position. At this point of depression of pedal 12 chain 22 will be drawn taut, and further downward movement of pedal 12 will cause chain 22 to pull outwardly on tension spring 34. The distance which pedal 12 may be displaced downwardly before resistance is encountered, and thus the speed at which the operator wishes to drive the vehicle, is determined by the amount of slack present in chain 22 when pedal 12 is in its raised, idle position. The operator may increase or decrease the amount of slack in chain 22, and thus set control device 1 for a particular highway speed by rotating control knob 26 clockwise or counterclockwise. For example, the rotation of control knob 26, and adjusting screw 36 therewith, in a counterclockwise direction will have the effect of moving spring housing 30 outwardly to the left as viewed in FIG. 2. Spring 34, being connected at its inner end to housing of carrier 30 will also move to the left along with coupling member 40, thereby increasing the amount of slack in chain 22 and raising the desired maximum driving speed. The clockwise rotation of control knob 26 will of course have the opposite effect and will draw housing 30 and spring 34 to the right, thereby decreasing the amount of slack in chain 22 and lowering the speed setting. It is noteworthy that the tension on spring 34 is never changed when adjusting the speed setting of device 1 by turning control knob 26. Spring 34 is simply moved left or right as a unit with housing 30. As spring housing 30 moves longitudinally within outer guide cylinder 28 it is guided by key 46 which slides back and forth within cooperating slot 48 formed in the top of guide cylinder 28, the disposition of key 46 within slot 48 being clearly shown in FIGS. 3 and 4. FIG. 4 also illustrates the concentric relationship of guide cylinder 28, spring housing 30, tubular sleeve 44, spring 34 and adjusting screw 36.

Figure 3:
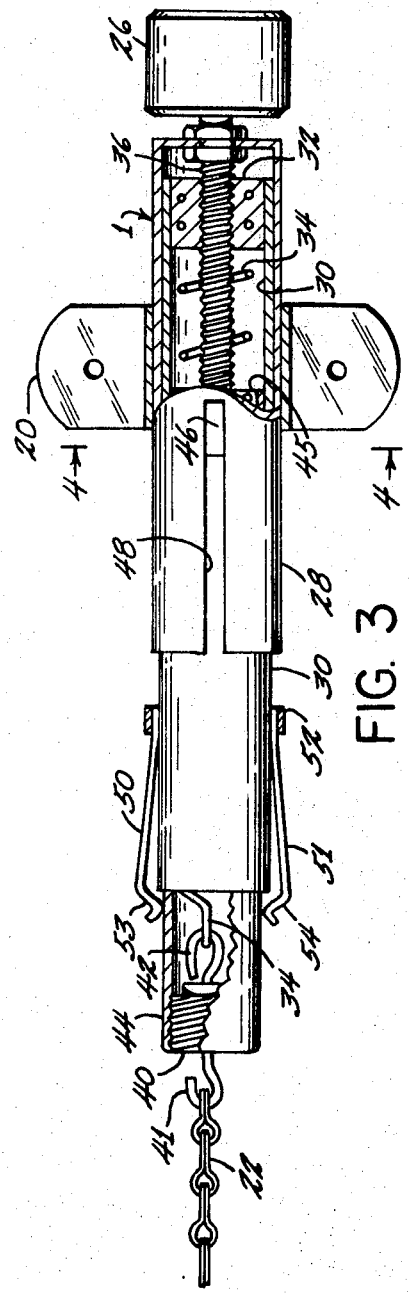
FIG. 3 is a top view of the speed controller device, partially broken away to show the operating parts in the position they will assume when the speed for which the device has been set is exceeded.

In order to quickly and accurately appraise the vehicle driver of the attainment of the maximum speed for which the device 1 has been set, I provide a unique, resilient stop mechanism in the form of flexible detent fingers 50 and 51 attached to the outside of spring housing 30 by a lock ring 52 as is shown in FIGS. 2 and 3. As long as the vehicle is being driven below the maximum speed setting of device 1, chain 22 will be slack and spring 34, coupling 40 and tubular sleeve 44 will be disposed rearwardly within sleeve housing 30 in the position shown in FIG. 2. Inwardly turned locking lugs 53 and 54 at the forward end of resilient fingers 50 and 51 will be in contact with the outer extremities of tubular sleeve 44 and coupling 40 in locking engagement therewith. When accelerator pedal 12 is depressed to the maximum speed position shown in solid lines in FIG. 1, chain 22 will become taut, and the restraining force exerted by lugs 53 and 54 on coupling 40 and tubular sleeve 44 through chain 22 as pedal 12 is further depressed will be of sufficient magnitude to clearly alert the driver to the fact that he is exceeding the maximum speed setting of control device 1. As the speed of the vehicle is increased beyond the maximum speed setting by depressing foot pedal 12 beyond the solid line position shown in FIG. 1, chain 22 will act against the substantial restraining influence of spring 34 and lugs 53 and 54 to pull tubular sleeve 44 and spring 34 therewith to the left into the outwardly extended position shown in FIG. 3. Resilient fingers 50 and 51 will be biased outwardly to the position shown in FIG. 3 as coupling 40 and tubular sleeve 44 are pulled to the left by chain 22. When tube 44 is pulled outwardly, its inner end 45 will move away from base portion 32 of housing 30 as is indicated in FIG. 3. Sleeve 44 serves the multiple functions of acting as a support for threaded coupling 40, guiding spring 34 during its expansion and contraction, and bearing against lugs 53 and 54 to bias them outwardly in response to the movement of accelerator pedal 12 beyond the maximum speed setting. After sleeve 44 has passed outwardly beyond resilient fingers 50 and 51, spring 34 will continue to resist the further movement of chain 22 to the left as indicated by the directional arrow, the restraining force of spring 34 being great enough to require a larger-than-normal downward force by the operator on foot pedal 12, thus reminding the driver that he is still exceeding the maximum speed setting of device 1.

The operation of my improved speed control device will be readily apparent from the foregoing description. By a simple adjustment of readily accessible knob 26, the driver can set my speed controller for any highway speed at which he desires to drive. The slack in chain 22 will permit accelerator pedal 12 to be operated in the normal manner at any speed below the maximum setting. When pedal 12 is depressed to the maximum position, chain 22 will become tight and the substantial resistance offered by resilient stop fingers 50 and 51 will permit the driver to rest his foot comfortably on pedal 12 without fear of depressing it and exceeding the speed setting. The driver will thus be able to very comfortably and easily hold pedal 12 against the restraining force offered by resilient fingers 50 and 51 to maintain a desired constant speed over long periods of time. If a higher speed is desired for passing, uphill driving or in an emergeny of any kind, only a minimum increase in foot pressure of approximately two pounds is required on accelerator pedal 12 to overcome resilient stop members 50 and 51 and extend chain 22 against the pressure of spring 34. The minimum number of moving parts within device 1, and the concentric alignment of the several movable elements substantially minimizes the possibility of jamming device 1 with the moving parts in a high or low speed position, and thereby endangering the occupants of the vehicle.

Those skilled in the art will readily appreciate the advantages offered by my unique speed control mechanism. Maintaining a constant speed on freeways and highways will eliminate the need for constantly adjusting the speed of the vehicle by changing the position of the accelerator pedal, and it will substantially improve gasoline mileage as has been demonstrated by the use of the speed control device of this invention. Further economy of operation is obtained by eliminating or substantially discouraging over-acceleration at start-ups. Most drivers accelerate too fast from a stop and have to then decelerate or coast down to the speed limit. The minimizing of fluctuations in engine speed will not only save gasoline, it will also greatly reduce wear on the moving parts of the engine as well as on the transmission and differential of any vehicle. Widespread use of my speed control device by highway drivers would also enhance safety on the highways by encouraging all drivers to drive at a substantially constant speed at or near the speed limit, thereby lessening the need for extensive passing of other vehicles which is a main cause of highway accidents today.

The particular embodiments of my improved speed controller which I have shown and described are intended to be illustrative only. I contemplate that various changes may be made in the size, shape and relationship of the various parts without departing from the spirit and scope of my invention as defined by the following claims.

I claim:

1. A speed control attachment for a vehicle having an accelerator pedal connected by a shiftable linkage to a throttle valve for regulating the flow of fuel to the vehicle engine comprising:

a lost motion connector member connected at one end thereof to said shiftable linkage and having its opposite end connected to a coil spring tensioning member, said connector member being freely movable through a lost motion distance in response to the movement of said accelerator pedal towards a position corresponding to a predetermined maximum vehicle speed setting before being restrained by said tensioning member;

a carrier for said coil spring movable relative to said one end of said connector member, said carrier comprising a tubular housing within which said coil spring is contained for movement therewith;

resilient detent means mounted on said tubular housing and constructed and arranged to exert a positive retraining force on a detent engaging member connected to said lost motion connector member; and adjustment means for moving said carrier and tensioning member so as to increase or decrease said lost motion distance within which said connector member may move freely, and thereby raise or lower said maximum speed setting, said adjustment means comprising an adjusting screw extending longitudinally into said housing through a threaded aperture in an end wall thereof, said adjusting screw being in threaded engagement with said aperture and restrained against longitudinal movement, whereby rotation of said screw will cause said tubular housing and coil spring carried thereby to move longitudinally with respect to said one end of said connector member.

2. A speed control device for a vehicle having an accelerator pedal connected by a shiftable linkage to a throttle valve for regulating the flow of fuel to the vehicle engine comprising:

a lost motion connector member connected at one end thereof to said shiftable linkage and having its opposite end arranged to coact with an elongate tensioning member, said connector member being freely movable through a lost motion distance in response to the movement of said accelerator pedal towards a position corresponding to a predetermined maximum vehicle speed setting before being restrained by said tensioning member;

resilient stop means constructed and arranged to exercise a restraining force on said connector member after said accelerator pedal has been moved to said maximum speed position to clearly indicate to the driver of the vehicle that said predetermined speed setting has been reached; and a coupling assembly attaching said opposite end of said connector member to said elongate tensioning member, said coupling assembly being engaged by said resilient stop means, and restrained thereby against movement with said connector member when said maximum speed setting is reached.

3. A speed control device as defined in claim 2, wherein:

said elongate tensioning member is enclosed within a tubular housing and anchored to one end thereof; and said resilient stop means comprises flexible detent fingers mounted on the opposite end of said tubular housing in restraining contact with said coupling assembly, the movement of said connector member as said maximum speed setting is exceeded causing said coupling assembly to bias said detent fingers out of restraining contact therewith.

4. A speed control device as defined in claim 3, wherein said coupling assembly comprises:

a coupling element attached to said connector member and said elongate tensioning member, and a tubular sleeve to which said coupling element is secured, said tubular sleeve extending within said tubular housing and having its inner end in abutting contact with said one end thereof when said maximum speed setting is not being exceeded.

References Cited

UNITED STATES PATENTS

| | | | |
|---|---|---|---|
| 2,338,869 | 1/1944 | Porter | 74—501 X |
| 2,245,852 | 6/1941 | Castle | 74—513 X |
| 2,295,897 | 9/1942 | Gillespie | 74—526 |
| 2,381,390 | 8/1945 | Vanke | 74—526 |
| 2,661,941 | 12/1953 | Smith | 74—526 UX |
| 2,818,747 | 1/1958 | Rich | 74—526 X |
| 2,895,346 | 7/1959 | Arch | 74—526 |
| 2,914,960 | 12/1959 | Edgerton | 74—526 |
| 2,979,172 | 4/1961 | Eshbaugh et al. | 74—482 X |
| 3,388,765 | 6/1968 | Sheppard | 74—513 X |

WESLEY S. RATLIFF, JR., Primary Examiner

U.S. Cl. X.R.

74—526